(No Model.) 3 Sheets—Sheet 1.

J. J. WAGAMAN.

HAY STACKER.

No. 387,934. Patented Aug. 14, 1888.

Witnesses.
M. E. Fowler
E. G. Siggers

Inventor.
James J. Wagaman
by C. A. Snow & Co.
his Attorneys.

N. PETERS, Photo-Lithographer, Washington, D. C.

(No Model.) 3 Sheets—Sheet 2.

J. J. WAGAMAN.

HAY STACKER.

No. 387,934. Patented Aug. 14, 1888.

Witnesses:
M. Fowler.
E. G. Siggers.

Inventor,
James J. Wagaman,
by C. A. Snow & Co.
his Attorneys

N. PETERS, Photo-Lithographer, Washington, D. C.

(No Model.) 3 Sheets—Sheet 3.

J. J. WAGAMAN.

HAY STACKER.

No. 387,934. Patented Aug. 14, 1888.

Witnesses:
M. Fowler,
C. L. Siggers.

Inventor,
James J. Wagaman
by C. A. Snow & Co.
his Attorneys.

N. PETERS, Photo-Lithographer, Washington, D. C.

UNITED STATES PATENT OFFICE.

JAMES JEFFERSON WAGAMAN, OF CARROLLTON, MISSOURI.

HAY-STACKER.

SPECIFICATION forming part of Letters Patent No. 387,934, dated August 14, 1888.

Application filed March 10, 1888. Serial No. 266,838. (No model.)

*To all whom it may concern:*

Be it known that I, JAMES JEFFERSON WAGAMAN, a citizen of the United States, residing at Carrollton, in the county of Carroll and State of Missouri, have invented a new and useful Improvement in Hay Rickers and Stackers, of which the following is a specification.

My invention has reference to hay rickers and stackers; and it consists in the improved construction, hereinafter described, whereby a simple and durable construction is provided, that can be conveniently operated to easily receive the hay, then elevated to the desired height, and finally discharge the hay from the opposite side to form the rick or stack.

Figures 1, 4:
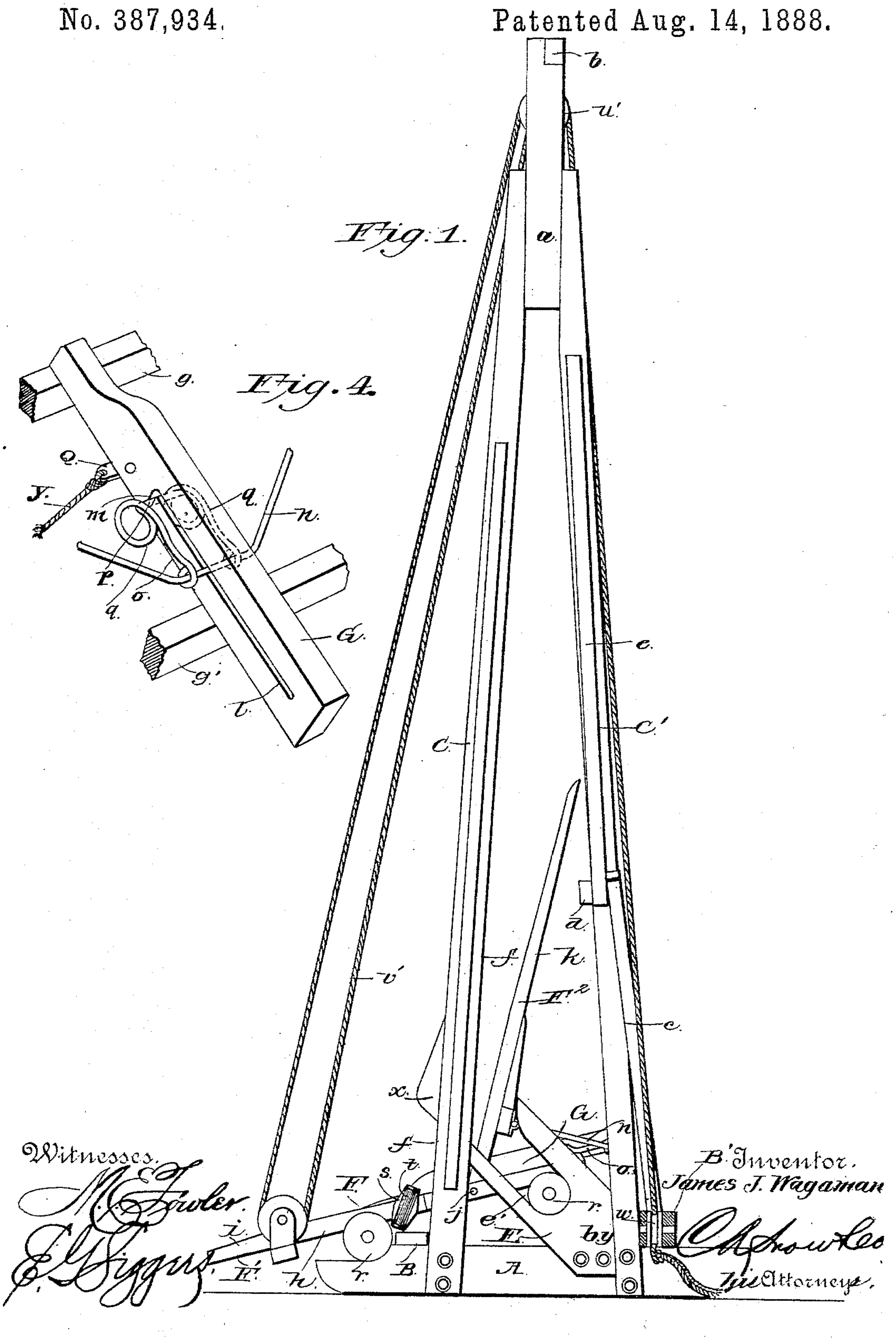
Figures 2, 5:
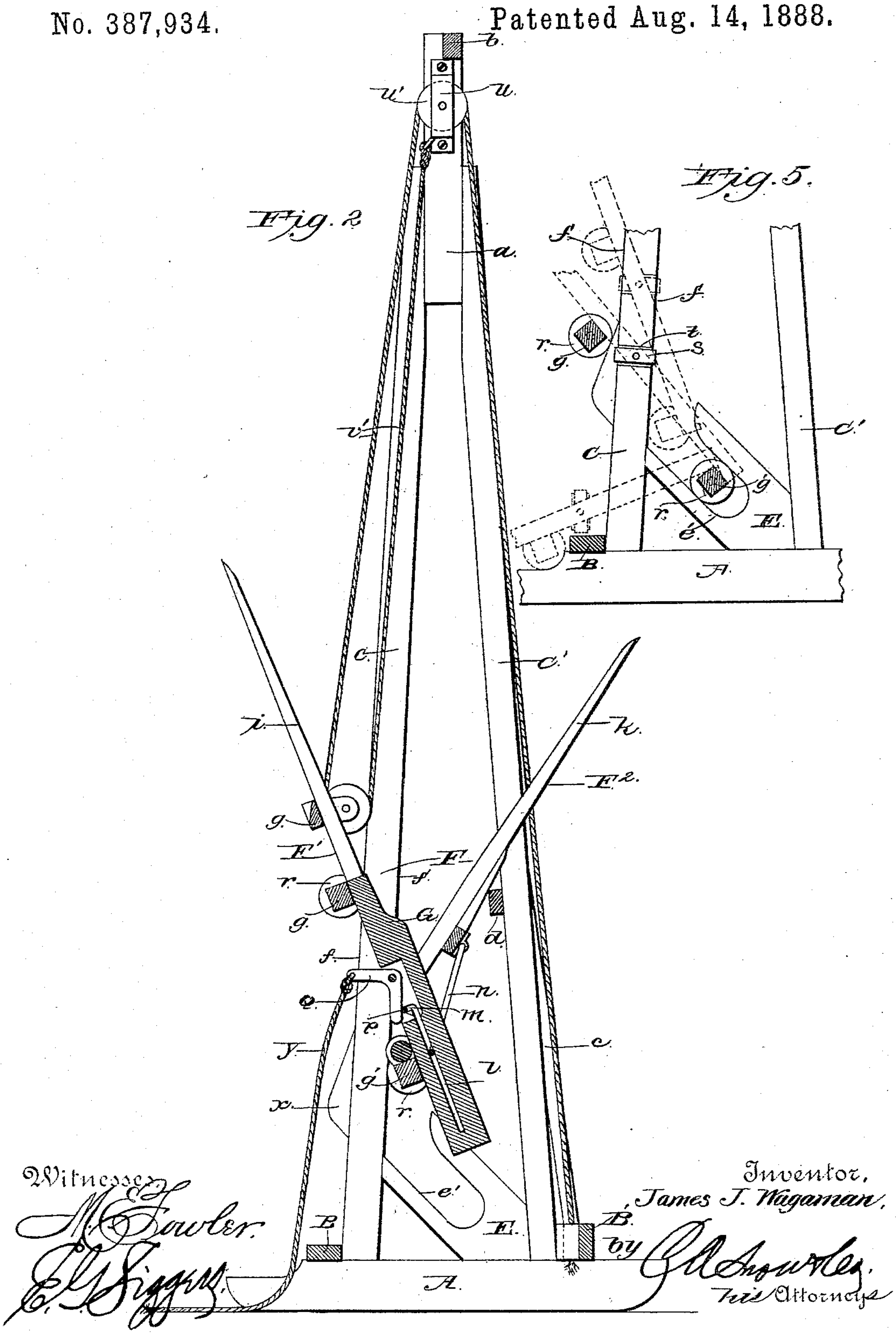
Figure 3:
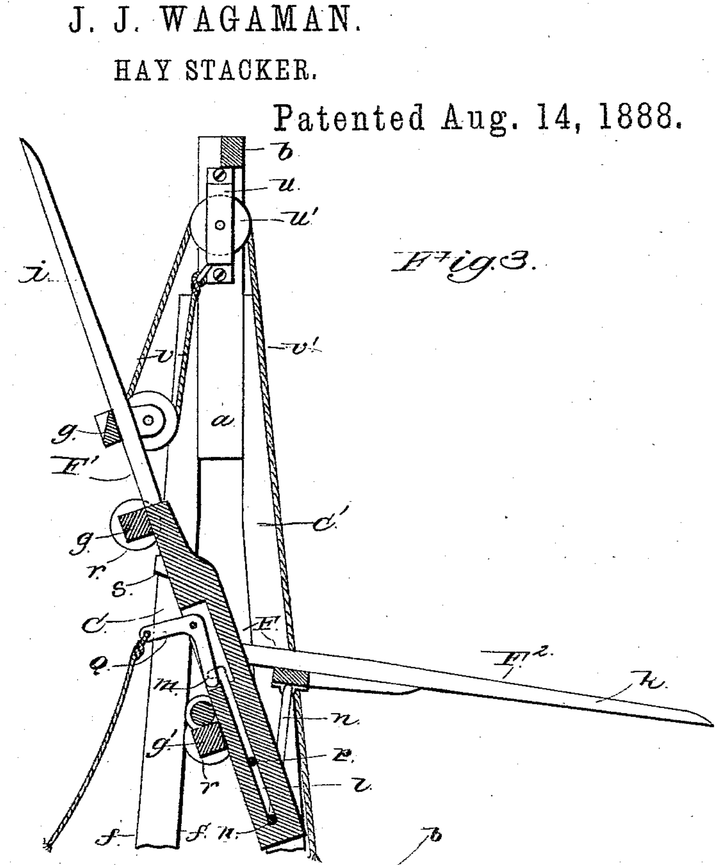
Figure 6:
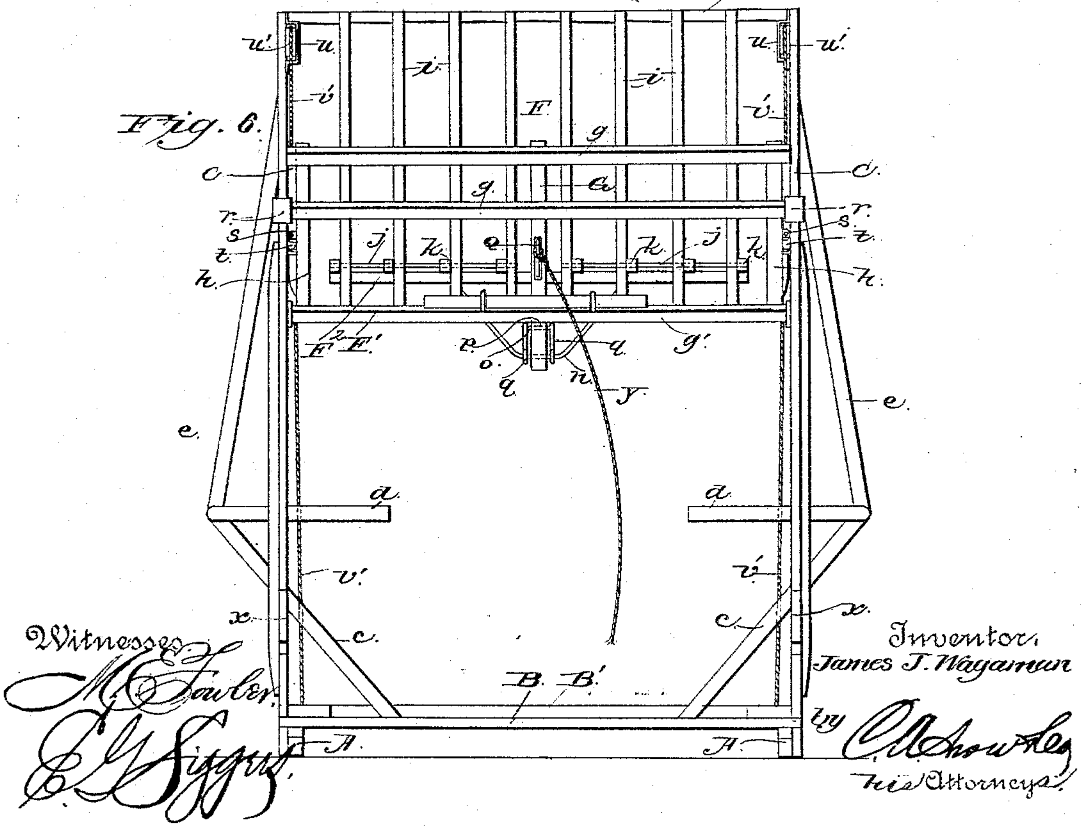

In the drawings, Figure 1 is a side view of a ricking and stacking apparatus constructed in accordance with my invention. Fig. 2 is a central vertical section showing the parts in a different position. Fig. 3 is a like view showing the position of the parts at the point where the hay is discharged. Fig. 4 is a detail view of the engaging and disengaging device for operating the rear pivoted fork-section. Fig. 5 is a detail view illustrating the movement of the guide-rollers. Fig. 6 is a front elevation of the apparatus.

The supporting-frame of the machine consists of the horizontal base-runners A A, connected together transversely by the front and rear bars, B B'. Two standards, C C', are mounted upon each runner and are inclined to converge toward each other at the top, where they are connected together by a block, *a*, to the upper end of which is connected a cross-brace, *b*. An inclined brace, *c*, is centrally secured on the rear side of each standard C', and has its upper end connected to a horizontal bar, *d*, secured transversely upon the inner face of the standard.

It will be noticed that the inner portion of each bar *d* extends inward within the dimension of the supporting-frame. The vertically-inclined braces *e* are connected at their lower ends with the outer ends of the bars *d*, and at their upper ends to the standards C'. On the upper side of each runner A, between the standards C C', is located a block, E, which is provided with an inclined slot, *e'*. The standards C C are each provided on their front and rear sides with longitudinal guide-ribs *f f*.

F is the fork-frame, which consists of the main portion or fork proper, F', and the section $F^2$, pivoted to the portion F'. The fork proper consists of three transverse parallel bars, *g g g'*, which are connected together at their ends by bars *h h* and intermediately by a parallel series of tines, *i*. On each side of the central line of the fork is arranged a transverse shaft, *j*, passing through the tines, and pivotally secured to said shafts are the rear portions of the tines *k* of the section $F^2$. A longitudinal bar, G, is rigidly secured between the two central tines *i*, and said bar is provided with a transverse slot, *l*, which extends nearly throughout its entire length. A notch or recess, *m*, is located at the forward end of the slot *l*. A yoke-shaped rod, *n*, is secured on the cross-bar of the pivoted section, and has its central portion playing along the slot. A wire link, *o*, is pivotally secured to the central portion of the yoke-rod *n*, and said link has a transverse portion, *p*, also sliding along said slot and adapted to enter the notch *m* when it reaches the limit of its forward movement. The link *o* is so bent and arranged that it forms side guide portions, *q*, which maintain the link in proper operative position. The ends of the inner bar, *g*, and the rear bar, *g'*, of the frame proper are provided with anti-friction rollers *r*. An inclined bracket, *s*, is secured in the outer face of each end bar, and has journaled therein an extended roller, *t*. On the inner side of each standard C, adjacent to the upper end thereof, is located a bracket, *u*, in which is journaled a groove-pulley, *u'*.

To each bracket *u* is secured one end of a rope or cable, *v' v'*, which then passes around a similar grooved pulley located on the outer corners of the frame of the fork proper. The cable is next led around the upper grooved pulley, *u'*, and then descends to pass around a grooved pulley, *w*, located in each end of the rear bar, B'. One of said cables or cords *v'* is then extended over to pass beneath the opposite pulley, *w*, so that both ropes or cables can be operated from one side of the frame.

The parts being in the position shown in Fig. 1, the hay is thrown upon the main portion of the fork proper, the inclined pivoted section being located to throw the straw back on the main section and prevent it from being thrown over the fork in loading. When the fork is properly loaded, the cords or cables are drawn upon to elevate the fork.

The continued movement of the fork causes its inner rollers $r$ to pass from the inclined slotted blocks and contact with the inner face of the adjacent standard C. As the rear rollers $r$ pass from the inclined slots, they contact with the inner vertical face of the adjacent front standard, C, while the front rollers strike the upper inclined surface of a block, $x$, having inclined faces and secured on the front of the vertical standards C, which contact raises the front end of the fork, so that the fork-frame assumes the position shown in Fig. 2, such movement throwing the hay to the center of the fork-frame. In the position immediately above referred to the pivoted section of the frame rests upon the inner projecting bars of the frame and are partly supported thereby. When the frame is in the position shown in Fig. 2, the rollers in the inclined brackets on the side of the machine are brought to a horizontal position, so that their rollers will travel upon the inner side faces of the standards C C, and thereby assist the free movement of the fork-frame. The further movement of the fork-frame brings it to the desired height. A bell-crank lever, Q, is pivoted in a vertical recess in the slotted bar G, so that the horizontal portion of said lever will extend longitudinally along the bottom of the notch in the end bar, G. The other portion of said lever Q projects beyond the bar G, and has its end perforated for the attachment of a cord or cable, $y$. By pulling the latter the horizontal portion of the bell-crank lever will be moved in the notch of the bar G to project the transverse portion of the link $o$ and permit the link to slide along the slot, permitting the pivoted section of the fork to drop away from the main section and discharge its load of hay. In lowering the frame the contact of the rollers will restore the main portion of the fork-frame to the horizontal position it originally occupied, which causes the pivoted section, by reason of its weight, to drop over toward the main portion and, sliding the link along said slot, to again enter and engage the notch in said bar, and thus automatically lock said pivoted section in position.

It will be obvious from the preceding description that the device is not only of slight and simple construction, but that it can be readily and conveniently operated at all times to stack hay.

The employment of the independent shaft-section to attach the pivoted section of the fork enables the bar G and its connections to be readily located within the dimension of the frame.

I claim—

1. The combination, with the supporting-frame, of the fork consisting of main portion and pivoted section, the slotted and notched bar G, the pivoted link connected to said section and engaging said slot and notch, and devices for disengaging the link from the slots and notch, as set forth.

2. The combination, with the supporting-frame, of the fork consisting of main portion and pivoted section, the slotted and notched bar G, the pivoted link connected thereto and engaging said slot and notch, a bell-crank lever having a portion in said notch, and a cord for operating said lever, as set forth.

3. The combination, with the supporting-frame, of the fork consisting of main portion and pivoted section, the slotted and notched bar G, and the pivoted link connected thereto and engaging said slot and notch, said link being provided with side guide portions and devices for disengaging the link from the slot and notch, as set forth.

4. The combination of the base, the converging standards erected thereon, the inclined block E, secured on the base between the standards and having the slots $e'$, the blocks $x$, secured to the front standards and having inclined faces, the fork having rollers adapted to move in the slots $e'$ and against the blocks $x$, and the cable controlling the fork, as set forth.

In testimony that I claim the foregoing as my own I have hereto affixed my signature in presence of two witnesses.

JAMES JEFFERSON WAGAMAN.

Witnesses:
C. E. PARKER,
J. S. BOWDRY.